(12) United States Patent
Stacey et al.

(10) Patent No.: US 8,850,204 B2
(45) Date of Patent: Sep. 30, 2014

(54) MULTI-BAND/MULTI-LINK SECURE KEY GENERATION AND DELIVERY PROTOCOL

(75) Inventors: Robert Stacey, Portland, OR (US); Jesse Walker, Portland, OR (US); Emily H. Qi, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 223 days.

(21) Appl. No.: 12/655,166

(22) Filed: Dec. 23, 2009

(65) Prior Publication Data

US 2011/0154038 A1 Jun. 23, 2011

(51) Int. Cl.
| | | |
|---|---|---|
| *H04L 9/32* | (2006.01) | |
| *H04L 9/06* | (2006.01) | |
| *H04L 9/08* | (2006.01) | |
| *H04W 12/04* | (2009.01) | |
| *H04L 29/06* | (2006.01) | |
| *H04W 12/02* | (2009.01) | |

(52) U.S. Cl.
CPC ............... *H04L 9/06* (2013.01); *H04L 2209/80* (2013.01); *H04L 63/0478* (2013.01); *H04L 9/3281* (2013.01); *H04L 9/0844* (2013.01); *H04W 12/04* (2013.01); *H04W 12/02* (2013.01); *H04L 2463/061* (2013.01); *H04L 63/061* (2013.01); *H04L 9/0637* (2013.01)
USPC ........... 713/170; 713/151; 713/160; 713/171; 726/3; 380/28; 380/29; 380/33; 380/34; 380/44; 709/237

(58) Field of Classification Search
USPC .......................................................... 713/170
See application file for complete search history.

(56) References Cited

U.S. PATENT DOCUMENTS

| | | | |
|---|---|---|---|
| 2007/0097934 A1* | 5/2007 | Walker et al. .................. | 370/338 |
| 2007/0106896 A1* | 5/2007 | Sandberg et al. .............. | 713/170 |
| 2007/0189249 A1 | 8/2007 | Gurevich et al. | |
| 2007/0250713 A1* | 10/2007 | Rahman et al. ............... | 713/171 |
| 2008/0072047 A1* | 3/2008 | Sarikaya et al. ............... | 713/171 |
| 2008/0298328 A1* | 12/2008 | Sharma .......................... | 370/338 |
| 2009/0214026 A1* | 8/2009 | Gueron et al. ................... | 380/29 |
| 2010/0169645 A1* | 7/2010 | McGrew et al. .............. | 713/170 |
| 2010/0332822 A1* | 12/2010 | Liu et al. ....................... | 713/151 |
| 2011/0055558 A1* | 3/2011 | Liu et al. ....................... | 713/160 |

FOREIGN PATENT DOCUMENTS

| | | |
|---|---|---|
| JP | 2003-169008 A | 6/2003 |
| JP | 2005-136885 A | 5/2005 |
| JP | 2006-148341 A | 6/2006 |
| JP | 2009-153111 A | 7/2009 |
| JP | 2009-207184 A | 9/2009 |
| WO | 2011/087575 A2 | 7/2011 |
| WO | 2011/087575 A3 | 11/2011 |

OTHER PUBLICATIONS

Changhua He and John C Mitchell, "Analysis of the 802.11i 4-way Handshake", Oct. 2, 2004, ACM, pp. 43-50.*
Jing Liu et al., "Security Verification of 802.11i 4-way Handshake Protocol", 2008, IEEE, pp. 1642-1647.*

(Continued)

*Primary Examiner* — Luu Pham
*Assistant Examiner* — Canh Le
(74) *Attorney, Agent, or Firm* — Forefront IP Lawgroup, PLLC

(57) ABSTRACT

A method is described for negotiating the use of multi-link ciphering and for the generation of unique keys for each of the links using a single 4-way handshake protocol exchange.

16 Claims, 4 Drawing Sheets

(56) References Cited

OTHER PUBLICATIONS

International Preliminary Report on Patentability and Written Opinion received for PCT Patent Application No. PCT/US2010/057573, mailed on Jul. 5, 2012, 7 pages.
Office Action received for Chinese Patent Application No. 201010623231.X, mailed on Jul. 3, 2013, 9 pages of English Translation and 5 pages of Chinese Office Action.
Office Action received for Japanese Patent Application No. 2012-542079, mailed on Jul. 30, 2013, 5 pages of English Translation and 6 pages of Office Action.
International Search Report and Written Opinion received for PCT Patent Application No. PCT/US2010/057573, mailed on Aug. 25, 2011, 10 pages.
Office Action received for Japanese Patent Application No. 2012-542079, mailed on Feb. 25, 2014, 3 pages of English Translation and 3 pages of Japanese Office Action.

* cited by examiner

| Multi-Link KDE Format 300 | | | |
|---|---|---|---|
| Link 1 MAC Address Present 302 | Link 2 MAC Address Present 306 | Reserved 310 | Link 1 MAC Address 314 | Link 2 MAC Address 318 |
| Bit 0 304 | Bit 0 308 | Bits 2-7 312 | 6 octets 316 | 6 octets 320 |

Fig. 3

MULTI-BAND/MULTI-LINK SECURE KEY GENERATION AND DELIVERY PROTOCOL

BACKGROUND

Wireless communication protocols, used by computing devices (devices), can operate or transmit using different carrier frequencies. For example, transmission can occur using carrier frequencies at or around 2.4 GHz, at or around 5 GHz or in the higher frequency 60 GHz band. The IEEE 802.11 standard defines protocols for operating in these frequency bands. In certain situations, devices can communicate with one another in the lower frequency band (e.g., 2.4 GHz or 5 GHz) and in certain situations communication can take place in the higher frequency band (e.g., 60 GHz). Communication in the lower frequency range can be used when the devices are relatively far away from one another, while the higher frequency band can be used to allow for a greater data transfer between the devices when they are relatively close together. In an exemplary operation, the operating frequency (i.e., operation in the low and high frequency bands) can be switched, as devices are moved closer to and further apart from one another.

Security and encryption is used by the devices and is part of standards such as IEEE 802.11. Typical security and encryption techniques include an exchange of keys between communicating devices. Provision can be made for such encryption and security techniques to take place in a particular operating frequency band and only for that band. Security and encryption techniques may have to be performed for each operating frequency band, which could include having a user determine the need to and when to configure security and encryption for each operating frequency band. Alternatively, if encryption and security is performed for one operating frequency band, and the generated keys from such configuration are used in the other operating frequency band, there can be exposure to key reuse attacks.

BRIEF DESCRIPTION OF THE DRAWINGS

The detailed description is described with reference to accompanying figures. In the figures, the left-most digit(s) of a reference number identifies the figure in which the reference number first appears. The same numbers are used throughout the drawings to reference like features and components.

FIG. 3 is a block diagram of an exemplary multi-link KDE data structure.

DETAILED DESCRIPTION

Overview

In a wireless communication device, where the device may operate as either or both as an authenticator or supplicant, a secure key generation and delivery protocol is implemented for operation in multi-band/multi-link. In an implementation, the IEEE 802.11 key management and delivery protocol can be extended to work in a multi-band environment, where different cipher suites can be used in each of the different bands. For example, the described techniques and mechanism can be implemented to be compatible with existing IEEE 802.11 key generation and delivery protocol as used in 2.4/5 GHz frequency operating bands. Furthermore, provision is made for concurrently operating or dynamically switching between 2.4 GHz/5 GHz and 60 GHz multi-link operation. In specific, a single 4-way handshake between devices is used to allow interfaces for the different bands (e.g., 2.4/5 GHz and 60 GHz) to obtain keys.

Network Implementation

Figure 1:
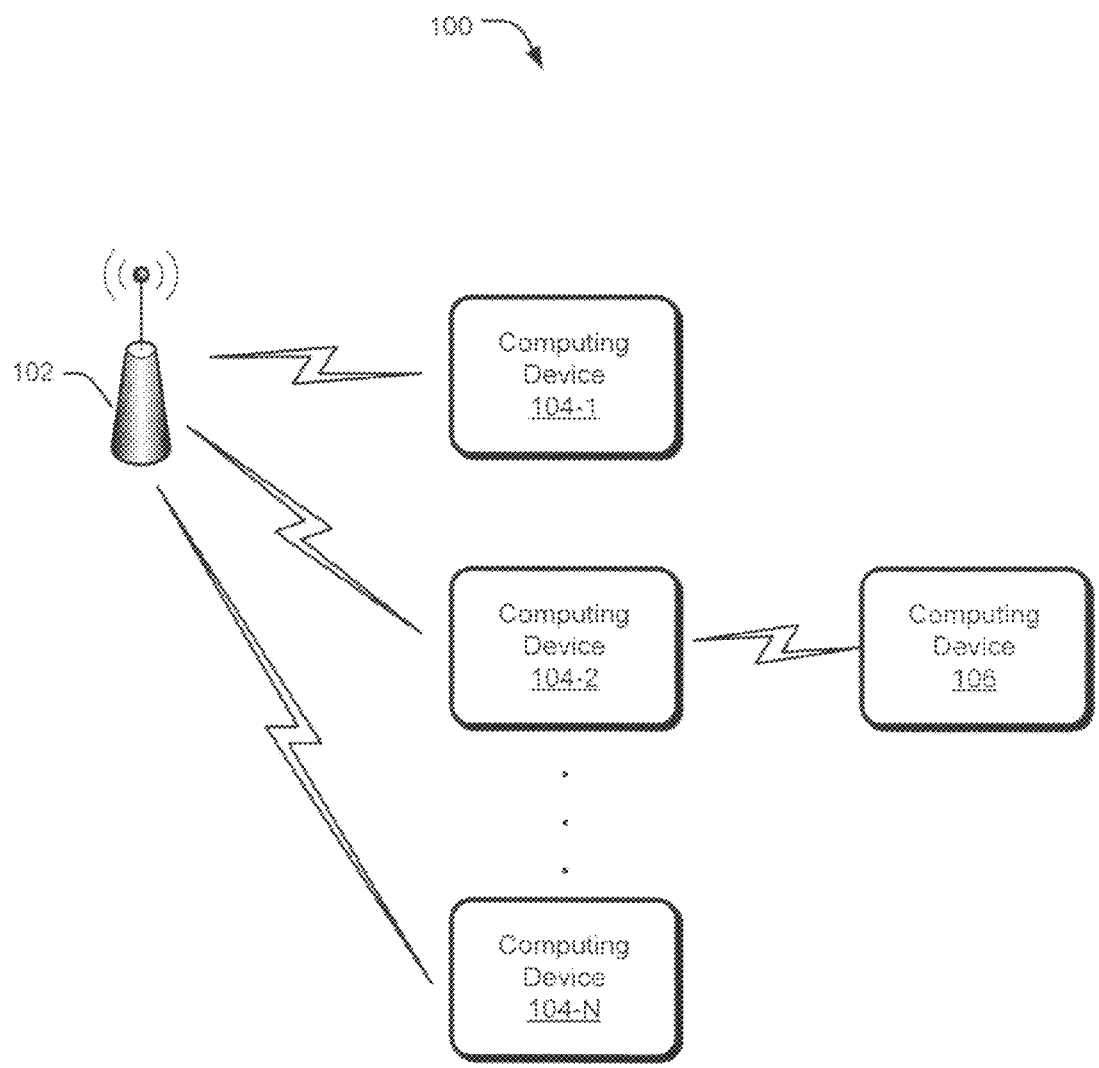
FIG. 1 is a block diagram of an exemplary wireless network that implements multi-band/multi-link key generation and delivery protocol.

FIG. 1 illustrates an exemplary wireless communication network 100 that uses the described methods and techniques. The network can include a wireless access point device or access point 102. In particular embodiments, the access point 102 can be a wireless router or similar device. The access point 102 communicates in either a lower frequency band, such as 2.4/5 GHz band as currently defined by the IEEE 802.11 standard, or in a higher frequency band, such as the 60 GHz band. In this implementation, the access point 102 can be referred to as an authenticator.

In this example, one or more wireless communication stations or computing devices 104-1, 104-2, and 104-N communicate with access point 102. In certain implementations, as further described below, computing devices 104 perform as supplicants to the authenticator or access point 102. In particular, a key generation and delivery protocol techniques described herein are performed by and with access point 102 and computing devices 104.

In certain situations, a computing device 104 may act as an authenticator, or act as both an authenticator and a supplicant. In this example, computing device 104-2 performs peer to peer communication with another computing device 106. In this implementation, the computing device 104-2 can be both an authenticator and supplicant to computing device 106. Likewise, computing device 106 can also be both an authenticator and supplicant to computing device 104-2. It is also to be understood that peer to peer communication can take place between computing devices 104 and 106.

Device Architecture

Figure 2:
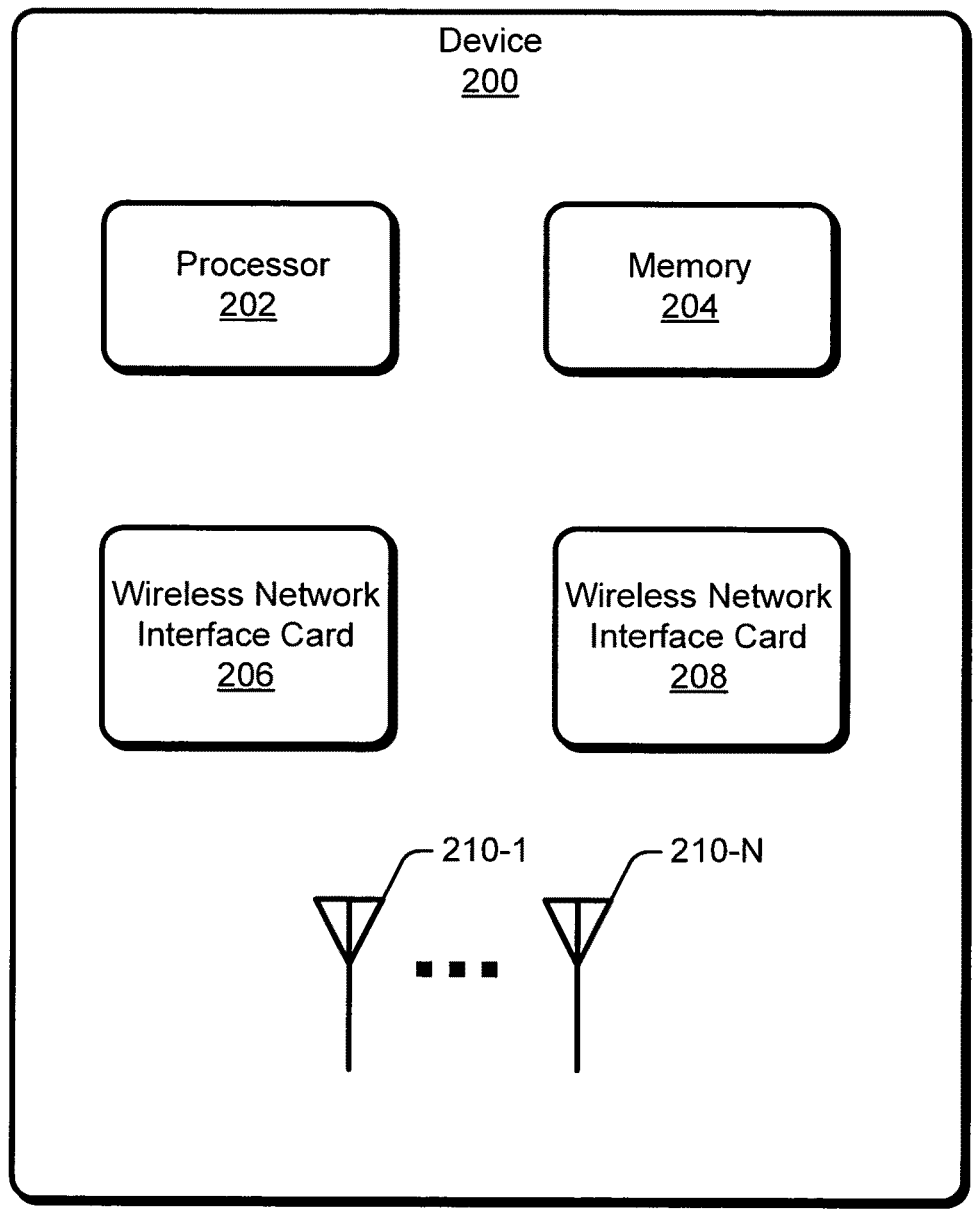
FIG. 2 is a block diagram of an exemplary authenticator/supplicant device that implements multi-band/multi-link key generation and delivery protocol.

FIG. 2 illustrates an exemplary wireless communication device 200. The device 200 includes devices such as access point 102, computing devices 104 and computing device 106. Device 200 can be an authenticator and/or a supplicant as described above. Device 200 describes certain components and it is to be understood that described components can be replaced with other components, and combined with one another. Additional components and devices may also be included in device 200.

A host microprocessor or processor 202, which can include multiple processors, is provided. Processor 202 includes functions, such as selecting a cipher suite and creating messages that implement the described key generation and delivery protocol techniques. Another function of processor 202 is creating packets for transmission. When device 200 performs as a receiving device, processor 202 receives and processes messages that are received by device 200.

The processor 202 can be connected or coupled to a memory 204. Memory 204 can include multiple memory components and devices. The memory component 204 can be coupled to the processor 202 to support and/or implement the execution of programs, such as key generation and delivery protocol. The memory component 204 includes removable/non-removable and volatile/non-volatile device storage media with computer-readable instructions, which are not limited to magnetic tape cassettes, flash memory cards, digital versatile disks, and the like. The memory 202 can store processes that perform the methods that are described herein. In particular, functions performed by an authenticator and/or supplicant can be stored in memory 202. The cipher suite may reside in memory component 204 and executed by processor 202.

In an implementation, the IEEE 802.11 standard is extended and implemented by device 200. Therefore, in such an implementation, device 200 includes particular hardware/firmware/software configurations to support the IEEE 802.11 standard. Device 200 implements a common medium access control or MAC layer, which provides a variety of functions that support the operation of IEEE 802.11 based wireless communications. As known by those skilled in the art, the MAC Layer manages and maintains communications between IEEE 802.11 wireless communication devices by coordinating access to a shared radio channel and utilizing protocols that enhance communications over a wireless medium. The MAC layer uses an 802.11 physical or PHY layer, to perform the tasks of carrier sensing, transmission, and receiving of IEEE 802.11 frames.

A network interface card and a wireless interface card may be included in the same component. In this implementation, a wireless network interface card 206 can be provided for multi-link operation in one band, such as 2.4/5 GHz, and a separate wireless network interface card 208 can be provided for operation in a second band, such as 60 GHz. Both wireless network interface card 206 and 208 can provide the secure key generation and delivery protocol for multi-link extensions to the IEEE 802.11 standard. Furthermore, one or more antennae 210-1 to 210-N can be included with or connected to the device 200. Antennae 210 can include multiple antennae for multiple input, multiple output operation). Antenna 210 can be configured to receive and send transmission.

Device 200 can be configured using the described components or other components not shown to perform the following. When device 200 operates in a higher 60 GHz band, Galois/Counter Mode or GCM can be used for data encryption and decryption. GCM is a block cipher mode of operation that uses universal hashing over a binary Galois field. In order to accommodate this crypto algorithm and remain backward compatible with existing crypto algorithms (i.e., CCM) used in legacy 802.11 bands (e.g., 2.4/5 GHz), enhancements are made to the existing IEEE 802.11 key generation and delivery protocol.

In particular, different cipher suites can be used in different bands (i.e., 2.4/5 GHz band and 60 GHz). For example, operation/communication in the 60 GHz band can implement Advanced Encryption Standard Galois/Counter Mode or AES GCM. In certain situations, such as certain management functions and to recover from poor RF conditions in the 60 GHz band fall back to the legacy 2.4/5 GHz band is performed. In other words, communication is switched from one band (i.e., 60 GHz) to the other band (i.e., 2.4/5 GHz). Since existing IEEE 802.11 standard for the 2.4/5 GHz uses AES CCM (CBC counter mode) for encryption and decryption, the use of AES GCM mode in the 2.4/5 GHz band, could penalize users, as there is no difference between CCM and GCM in the two bands; however users may not be equipped to know which to use. In an implementation, GCM usage is used for 60 GHz operation, and CCM usage is continued to be used in the lower 2.4/5 GHz lower bands.

Therefore, backwards compatibility is provided with existing IEEE 802.11 standard key management used in 2.4/5 GHz bands. Furthermore, provision can be made to dynamically switch between 2.4/5 GHz and 60 GHz multi-link environments. This is performed by constructing/generating different keys for each band.

In an implementation, a cipher suite selector may be provided for multi-band operation. For example, when GCM is used in the 60 GHz band, cipher suite selected may be "CCMP+GCMP", since CCMP (where "P" is protocol) is used in 2.4/5 GHz band and GCMP is used in 60 GHz band.

A data structure can be implemented for negotiating the multi-link protocol. In an implementation, additional IEEE 802.11 KDEs may be defined for multi-link operation. In particular, a multi-link KDE may be defined as follows (using Backus-Naur Form or BNF notation):

Multi-link-KDE:=Flags Address1 Address2.
Flags:=byte—indicates the link for each address
    Bit 1=2.4/5 GHz link address; 1 if a 2.4/5 GHZ link is used, 0 otherwise
    Bit 2=60 GHz link address; 1 if a 60 GHz link is used, 0 otherwise
    Bits 3-8=reserved; set to 0 by the transmitter, ignored by the receiver
Address1:=byte[6]—MAC address for 2.4/5 GHz link if Flags bit 1 is 1, set to 00 00 00 00 00 00 if Flags bit 1 is 0
Address2:=byte[6]—MAC address for 60 GHz link if Flags bit 2 is 1, set to 00 00 00 00 00 00 if Flags Bit 2 is 0.

It is to be understood that any other data structure can be used, where such a data structure specifies different links in use.

FIG. 3 illustrates the format for an exemplary multi-link KDE.

Exemplary Protocol

An authenticator and supplicants, and peer to peer stations, negotiate the use of a multi-link mechanism. In an implementation, a 4-way handshake can be implemented as a transport for the protocol. The 4-way handshake can implement the existing IEEE 802.11 4-way handshake. The 4-way handshake protocol can make use of four messages. The first message, sent by the authenticator to the supplicant, proposes a range of options, including a multi-link option. The second message, sent by the supplicant to the authenticator, either rejects the options, or else selects one of the options proposed in the first message. The third message, sent by the authenticator to the supplicant, confirms the value selected in the second message and provides additional information for key generation. The fourth message, sent by the supplicant to the authenticator, confirms receipt of the third message and indicates that the security association is in effect. The following messages follow current IEEE 802.11 standard communications, and will be understood by those skilled in the art.

Message 1

An authenticator can insert a single Multi-Link KDE into the key data field of Message 1, if the RSN IE (robust security network information element) of Message 1 advertises a multi-link cipher suite. The Multi-Link KDE specifies (a) the MAC address the authenticator's station uses to transmit 4-way handshake Message 1 and (b), if used, its MAC address used in an alternate band. The authenticator does not include a Multi-Link KDE in Message 1, if it does not advertise support for the multi-link cipher suite. The supplicant discards message 1, if it advertises the multi-link cipher suite but does not contain a Multi-Link KDE, or if the KDE does, not specify the MAC address of the transmitter over the link that received message 1.

Message 2

The supplicant can include two multi-link KDEs in the key data field of Message 2, if it selects the multi-link cipher suite. The first multi-link KDE shall specify (a) the MAC address of the supplicant's station used to transmit the 4-Way handshake Message 2 and (b), and if used its alternate MAC address to be used in an alternate band. The supplicant can include an alternate band MAC address only if the authenticator did so in its Message 1 multi-link KDE. The second multi-link KDE is the multi-link KDE received from the authenticator in Message 1 of the 4-Way handshake. The authentication silently discards Message 2 if the Multi-Link KDEs are included, but the supplicant station did not select the multi-link cipher suite, or if the supplicant's KDE does not specify the MAC address of the supplicant's station used to transmit Message 2, or if the authenticator's KDE is not the same as what the authenticator sent in Message 1.

Message 3

The authenticator includes its multi-link KDE, followed by the multi-link KDE received from the supplicant in the key data field of Message 3, if the supplicant selected the multi-link cipher suite in Message 2. The supplicant discards Message 3, if it selected the multi-link cipher suite in message 2 and if the key data field of Message 3 does not include the supplicant's multi-link KDE from Message 2, or if Message 3 includes a different authenticator multi-link KDE than what the supplicant received in Message 1.

Message 4

Message 4 may be the same as Message 4 defined in IEEE 802.11

Key Derivation

The negotiating stations use the data structure used to negotiate the multi-link feature for key derivation. In an embodiment, the authenticator and supplicant use the authenticator's multi-link KDE in place of the authenticator's MAC address in the 802.11 key derivation algorithm, and the supplicant's multi-link KDE in place of the supplicant's MAC address when the multi-link cipher suite is selected. The key derivation or construction phase can be implemented using current IEEE 802.11 processes, which are extended to construct additional key bits—extending by a total of 128 bits. This allows different sets of keys to be derived. Therefore, a 128 bit key can be used for one band (e.g., 2.4/5 GHz) and a 128 bit key can be used for the other band (e.g., 60 GHz).

The parties derive encryption keys for each link. Further, implementing the IEEE 802.11 standard, the authenticator and supplicant can derive the 4-Way Handshake 128-bit keys KCK and KEK along with one 128 bit encryption key for each of the two bands:

KCK∥KEK∥CCM-TK∥GCM-TK
:=prf (PMK, Authenticator-Multi-link-KDE, Supplicant-Multi-link-KDE, ANonce, SNonce)
KCK=1st 128 bits=key confirmation key for this security association
KEK=2nd 128 bits=key encryption key for this security association
CCM-TK=3rd 128 bits=temporal key used with AES-CCM over 2.4/5 GHZ link
GCM-TK=4th 128 bits=temporal key used with AES-GCM over 60 GHz link where prf is the pseudo-random function defined in IEEE 802.11-2007.

Figure 4:
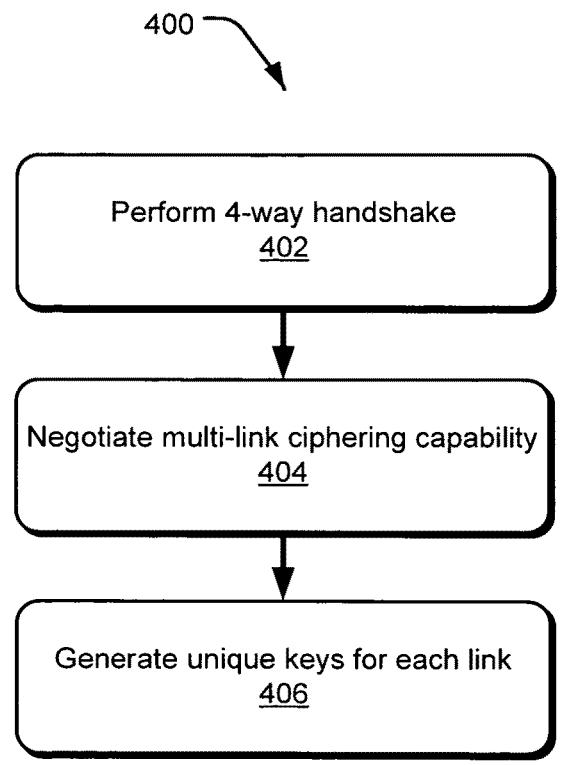
FIG. 4 is a flow chart illustrating exemplary key generation and delivery.

FIG. 4 is a flow chart diagram 400 for an exemplary process of multi-link security association between two wireless computing devices. The process can be performed by devices described above, and as discussed, can be performed by an authenticator and/or supplicant. The order in which the method is described is not intended to be construed as a limitation, and any number of the described method blocks can be combined in any order to implement the method, or alternate method. Additionally, individual blocks can be deleted from the method without departing from the spirit and scope of the subject matter described herein. Furthermore, the method can be implemented in any suitable hardware, software, firmware, or a combination thereof, without departing from the scope of the invention.

At block 402, a 4-way handshake is performed. This can be the 4-way handshake protocol as described above. As a result of the 4-way handshake protocol, unique keys can be generated for each of the operating bands that the wireless computing devices operate in. In an implementation, one of the wireless computing devices is an authenticator and can generate the first message of the 4-way handshake protocol, and list multi-link ciphering as one of supported cipher suites in the first message. The other wireless device acting as a supplicant, can generate a second message of the 4-way handshake protocol and select multi-link ciphering as the desire cipher suite and indicate the choice the second message.

Furthermore, the authenticator in the first message can include MAC addresses used by the authenticator on each of the links. The supplicant which generates the second message, can include in the second message the MAC addresses used by the supplicant on each of the links. The MAC addresses of the first message can be included by the supplicant as a confirmation of receipt in the 4-way handshake protocol. The authenticator, in the 4-way handshake can send a third message as a confirmation of correct receipt of the MAC addresses.

At block 404, negotiating of multi-link ciphering capability is performed. This can be during the 4-way handshake protocol.

At block 406, generating unique keys (temporal) for each of the links is performed. This is the result of the 4-way protocol exchange. The unique key of each link can be generated using a defined key generation function. In the key generation, an input may be used as to MAC addresses used on each of the authenticator's link interfaces, as well as MAC addresses used on each of the supplicant's link interfaces.

The key generation can be performed with an authenticator and supplicant. In particular, as discussed above, the IEEE 802.11 standard can be extended, with the authenticator's multi-link KDE in place of its MAC address in the 802.11 key derivation algorithm, and the supplicant's multi-link KDE in place of its MAC address when the GCM cipher suite is selected.

In the key generation, the authenticator can generate a unique key for each link using the defined generation function, on receipt of second message of the 4-way handshake. In addition, the supplicant can generate a unique key for each link using the defined generation function, on receipt of the third message of the 4-way handshake using a defined key generation function.

As discussed, each link used for communication between the two wireless computing devices, can be supported in different operating frequency bands. As also discussed, different data encryption can be used for each link. For example Galois Counter Mode can be used for data encryption for a link operating one frequency band and Counter with CBC-MAC or CCM can be used for data encryption on a link operating in another frequency band.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. For example, the systems described could be configured as communication devices, computing devices, and other electronic devices.

What is claimed is:

1. A method to establish a multi-link security association between two wireless computing devices comprising:
    selecting from one band of multiple bands to perform multi-link ciphering based on a cipher suite particular to the selected band;
    performing a 4-way handshake protocol exchange between the two devices, wherein the 4-way handshake protocol is performed using one or messages, wherein a first message of the one or more messages, includes an inserted Multi-Link Key Data Encryption (KDE) into a key data field of the first message by an authenticator device of the two devices, wherein the Multi-Link KDE is defined by flags, a first MAC address and a second MAC address, wherein the flags indicate the link of each MAC address, wherein the first MAC address for 2.4/5 GHz link when the first bit of the flags is 1, and the second MAC address for 60 GHz link when the second bit of the flags is 1;
    negotiating multi-link ciphering capability that includes multiple links, during the 4-way handshake protocol exchange;
    generating unique keys for each of the links as a result of the 4-way handshake protocol exchange and the first message of during the 4-way handshake protocol that includes the first and second MAC addresses on each of link of a multi-link security association in the first message, wherein the generating unique keys is based on the Multi-Link KDE.

2. The method of claim 1, wherein each link used for communication by the wireless computing devices, is supported in a different operating frequency band.

3. The method of claim 2, wherein Galois Counter Mode is used for data encryption on a link operating in one frequency band, and Counter with CBC-MAC (CCM) is used for data encryption on a link operating in another frequency band.

4. The method of claim 1, wherein unique keys are generated for each of the operating bands as a result of the 4-way handshake protocol.

5. The method of claim 1, wherein a wireless computing device acting as authenticator, generates a first message of the 4-way handshake protocol and lists multi-link ciphering as one of the supported cipher suites in the first message of the 4-way handshake protocol.

6. The method of claim 5, wherein a wireless computing device acting as supplicant, generates a second message of the 4-way handshake protocol, selects multi-link ciphering as the desired cipher suite and indicates this choice in the said second message of the 4-way handshake protocol.

7. The method of claim 1, wherein the generating unique keys provides for a unique key for each link using a defined key generation function.

8. The method of claim 7, wherein the defined key generation function includes, as an input the MAC addresses used on each of an authenticator's link interfaces as well as the MAC addresses used on each of a supplicant's link interfaces.

9. The method of claim 7, wherein an authenticator generates a unique key for each link using the defined generation function, on receipt of a second message of the 4-way handshake protocol.

10. The method of claim 7, wherein a supplicant generates a unique key for each link using the defined generation function, on receipt of a third message of the 4-way handshake protocol using a defined key generation function.

11. A wireless communication device comprising:
    one or more processors;
    a memory to coupled with the one or more processors to:
        perform a 4-way handshake protocol, wherein the 4-way handshake protocol is performed using one or messages, wherein a first message of the one or more messages, includes an inserted Multi-Link Key Data Encryption (KDE) into a key data field of the first message by an authenticator device of the two devices, wherein the Multi-Link KDE is defined by flags, a first MAC address and a second MAC address, wherein the flags indicate the link of each MAC address, wherein the first MAC address for 2.4/5 GHz link when the first bit of the flags is 1, and the second MAC address for 60 GHz link when the second bit of the flags is 1;
    negotiate multi-link ciphering capability that includes multiple links, during the 4-way handshake protocol exchange; and
    generate unique keys for each of the links as a result of the 4-way handshake protocol exchange and the first message of during the 4-way handshake protocol that includes the first and second MAC addresses on each of link of a multi-link security association in the first message, wherein the generated unique keys is based on the Multi-Link KDE;
    a cipher suite selector configured to select a cipher suite particular to a band selected from one band of multiple bands to perform multi-link ciphering based on, wherein the cipher suite is performed during the 4-way handshake protocol; and
    one or more wireless interface cards configured to transmit and receive packets that include the first message in two or more different operating frequency bands.

12. The wireless communication device of claim 11, wherein a program executing on the one or more processors implements authenticator functions of the 4-way handshake protocol.

13. The wireless communication device of claim 11, wherein a program executing on the one or more processors implements supplicant functions of the 4-way handshake protocol.

14. The wireless communication device of claim 11, wherein the one or more wireless interface cards encrypt and decrypt data packets using Galois Counter Mode (GCM) when operating in one of the frequency bands.

15. The wireless communication device of claim 11, wherein the one or more wireless interface cards encrypt and decrypt data packets using Counter with CBC-MAC (CCM) when operating in one of the frequency bands.

16. The wireless communication device of claim 11, wherein the one or more wireless interface cards transmit and receive the packets using a 4-way handshake protocol.

* * * * *

UNITED STATES PATENT AND TRADEMARK OFFICE
CERTIFICATE OF CORRECTION

PATENT NO.         : 8,850,204 B2
APPLICATION NO.    : 12/655166
DATED              : September 30, 2014
INVENTOR(S)        : Robert Stacey et al.

Page 1 of 1

It is certified that error appears in the above-identified patent and that said Letters Patent is hereby corrected as shown below:

In the Claims

In column 7, line 52, in claim 4, delete "unique" and insert -- the unique --, therefor.

In column 7, line 61, in claim 6, delete "a second" and insert -- the second --, therefor.

In column 8, line 7, in claim 9, delete "a second" and insert -- the second --, therefor.

In column 8, line 15, in claim 11, delete "to coupled" and insert -- coupled --, therefor.

Signed and Sealed this
Third Day of February, 2015

Michelle K. Lee
*Deputy Director of the United States Patent and Trademark Office*